(12) United States Patent
Stojanovic et al.

(10) Patent No.: US 10,811,645 B2
(45) Date of Patent: Oct. 20, 2020

(54) BATTERY SYSTEM

(71) Applicant: Samsung SDI Co., Ltd., Yongin-si, Gyeonggi-do (KR)

(72) Inventors: Oliver Stojanovic, Hausmannstatten (AT); Damir Kovac, Graz (AT); Ralph Wuensche, Graz (AT)

(73) Assignee: Samsung SDI Co., Ltd., Yongin-si (KR)

(*) Notice: Subject to any disclaimer, the term of this patent is extended or adjusted under 35 U.S.C. 154(b) by 0 days.

(21) Appl. No.: 15/653,791

(22) Filed: Jul. 19, 2017

(65) Prior Publication Data

US 2018/0026243 A1 Jan. 25, 2018

(30) Foreign Application Priority Data

Jul. 21, 2016 (EP) .................. 16180508

(51) Int. Cl.
H01M 2/10 (2006.01)
H01M 2/20 (2006.01)
H01M 10/613 (2014.01)
H01M 10/6568 (2014.01)
H01M 10/6566 (2014.01)
H01M 10/6556 (2014.01)
H01M 10/647 (2014.01)
(Continued)

(52) U.S. Cl.
CPC .......... H01M 2/1077 (2013.01); B60L 50/64 (2019.02); B60L 58/21 (2019.02); H01M 2/206 (2013.01); H01M 10/613 (2015.04); H01M 10/647 (2015.04); H01M 10/6556 (2015.04); H01M 10/6566 (2015.04); H01M 10/6568 (2015.04)

(58) Field of Classification Search
CPC ... H01M 2/1077; H01M 2/206; H01M 10/613
See application file for complete search history.

(56) References Cited

U.S. PATENT DOCUMENTS

2007/0087266 A1 4/2007 Bourke et al.
2010/0075206 A1 3/2010 Tamura
2012/0224326 A1 9/2012 Kohlberger et al.
(Continued)

FOREIGN PATENT DOCUMENTS

JP 2010-80134 A 4/2010
JP 2011-65794 A 3/2011
(Continued)

OTHER PUBLICATIONS

European Search Report dated Nov. 21, 2016, for corresponding European Patent Application No. 16180508.0 (6 pages).
(Continued)

Primary Examiner — Osei K Amponsah
(74) Attorney, Agent, or Firm — Lewis Roca Rothgerber Christie LLP

(57) ABSTRACT

A battery system includes: a battery submodule including a plurality of secondary battery cells electrically connected to each other in series or in parallel; a battery module including a plurality of the battery submodules connected to each other in series or in parallel; and a crossbeam including a coolant duct. The battery module is mechanically coupled to the crossbeam, and the crossbeam is in thermal contact with a first side surface of at least one of the battery submodules of the battery module.

20 Claims, 11 Drawing Sheets

(51) Int. Cl.
*B60L 58/21* (2019.01)
*B60L 50/64* (2019.01)

(56) References Cited

U.S. PATENT DOCUMENTS

| | | | |
|---|---|---|---|
| 2012/0237803 A1* | 9/2012 | Mardall | ............... B60L 3/0046 |
| | | | 429/53 |
| 2014/0234675 A1* | 8/2014 | Maini | ............... H01M 10/6563 |
| | | | 429/71 |
| 2014/0342202 A1* | 11/2014 | Chang | ................... B60K 11/06 |
| | | | 429/71 |
| 2016/0133890 A1 | 5/2016 | Lee et al. | |
| 2016/0218333 A1 | 7/2016 | Takasaki et al. | |

FOREIGN PATENT DOCUMENTS

| | | |
|---|---|---|
| JP | 2011-198688 A | 10/2011 |
| JP | WO2015/045401 A1 | 4/2015 |
| KR | 10-2015-0015169 A | 2/2015 |
| KR | 10-2016-0016105 A | 2/2016 |

OTHER PUBLICATIONS

Korean Office Action dated Sep. 19, 2018, for corresponding Korean Patent Application No. 10-2017-0089715 (6 pages).
Korean Patent Notice of Allowance for corresponding Korean Patent Application No. 10-2017-0089715, dated Aug. 5, 2019, 5 pages.

* cited by examiner

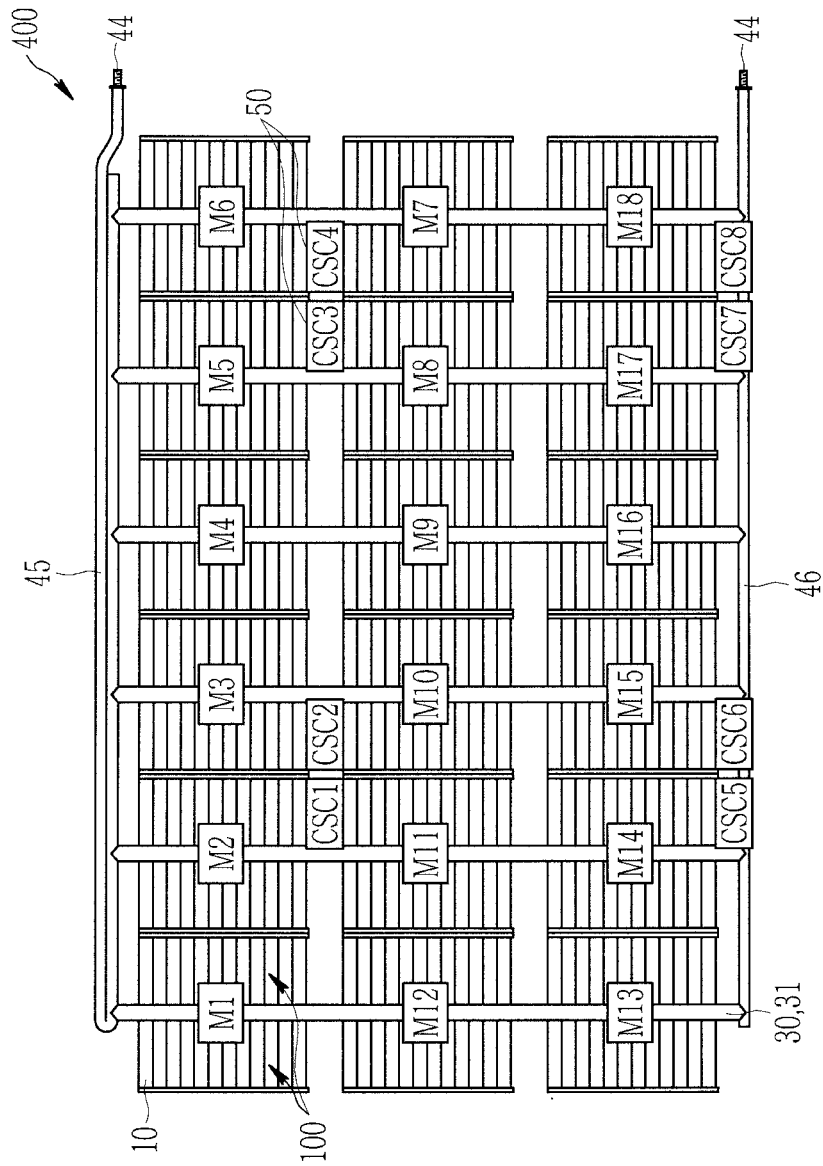

BATTERY SYSTEM

CROSS-REFERENCED TO RELATED APPLICATION

This application claims priority to and the benefit of European Patent Application No. 16180508.0, filed on Jul. 21, 2016 in the European Patent Office, the content of which is incorporated herein in its entirety by reference.

BACKGROUND

1. Field

Aspects of embodiments of the present invention relate to a battery system including a plurality of battery modules.

2. Description of the Related Art

A rechargeable battery differs from a primary battery in that it is designed to be repeatedly charged and discharged, while the latter is designed for only an irreversible conversion of chemical to electrical energy. Low-capacity rechargeable batteries are used as the power supply for, as an example, small electronic devices, such as cellular phones, notebook computers, and camcorders, while high-capacity rechargeable batteries are used as the power supply for, as an example, engines in hybrid vehicles and the like.

In general, a rechargeable battery includes an electrode assembly including a positive electrode, a negative electrode, and a separator interposed between the positive and negative electrodes, a case receiving (or accommodating) the electrode assembly, and an electrode terminal electrically connected to the electrode assembly. The case may have a cylindrical or rectangular shape depending on a desired use and/or the actual use of the rechargeable battery. An electrolyte solution is injected into the case for charging and discharging of the rechargeable battery through an electrochemical reaction of the positive electrode, the negative electrode, and the electrolyte solution.

Rechargeable batteries may be used as (e.g., as a part of) a battery module formed of a plurality of battery cells connected in series to be used for, as an example, powering the engine of a hybrid vehicle that benefits from relatively high energy density. For example, the battery module is formed by connecting an electrode terminal of each of the battery cells to each other, the number of battery cells depending on the amount of power desired, such that a relatively high-power rechargeable battery can be realized.

In order to safely use these battery modules, heat generated by the rechargeable batteries (e.g., by the battery cells) should be efficiently emitted, discharged, and/or dissipated from the battery module. If there is insufficient heat emission/discharge/dissipation, a temperature deviation occurs between the respective battery cells such that the battery module may no longer generate the desired amount of power. In addition, when the internal temperature of a rechargeable battery increases due to the heat generated thereby, abnormal reactions occur therein and, thus, charging and discharging performance of the rechargeable battery deteriorates and the life-span of the rechargeable battery is shortened.

Thus, cooling devices for cooling the rechargeable battery modules by efficiently emitting/discharging/dissipating heat generated by the batteries are generally included in such rechargeable battery modules. As a cooling device should be brought into thermal contact with a surface of a battery module, the cooling device is usually constructed as separate device to be attached to the surface of the battery module or is integrated into a housing of the battery module.

In order to further increase the energy density of battery systems (e.g., in order to increase the driving range of electric vehicles), a plurality of battery modules can be stacked and electrically interconnected to form a battery pack. In order to ensure sufficient emission/discharge/dissipation of heat generated by the battery modules in multi-level battery packs, the multi-level battery packs may include a cooling device for each layer of the battery pack. However, this configuration may lead to an increased height of the battery system and, thus, to increased packaging dimensions.

The structure for distributing coolant to a plurality of battery modules is generally a weak point in terms of mechanical stability and rigidity during normal use and/or in a crash situation. Depending on the type of rechargeable (or secondary) battery (e.g., a lithium ion battery) and the type of used coolant (e.g., water-based coolants), leaking coolant can severely damage the battery modules and even surrounding structures (e.g., other structures or components in an electrical vehicle). As an example, all battery modules stacked with cooling devices may be destroyed or rendered inoperable if a single cooling device fails.

SUMMARY

One or more of the drawbacks of the prior art may be avoided or at least reduced or mitigated according to aspects of the present invention.

According to one embodiment, a battery system includes: a battery submodule including a plurality of secondary battery cells electrically connected to each other in series or in parallel; and a battery module including a plurality of the battery submodules connected to each other in series and mechanically coupled to a crossbeam. The crossbeam may include a coolant duct and may be in thermal contact with a first side surface of at least one of the battery submodules.

The battery system may include battery submodules each including a plurality of secondary battery cells that are electrically connected in an nsmp configuration in which n cells are connected to each other in series and m cells are connected to each other in parallel. Thus, each battery submodule provides a voltage corresponding to the voltage of n cells and a current corresponding to the current of m cells. For example, in some embodiments, n equals at least two, four, six, eight, ten, or twelve and m equals at least one, two, three, four, or five. Commercially available battery modules having, for example, 12 battery cells, may be used as the battery submodules according to embodiments of the present invention. Each battery submodule may be mechanically self-supporting and may be easily preassembled.

In the battery system according to embodiments of the present invention, a plurality of such battery submodules may be electrically connected to each other in series and/or in parallel in a ks/lp configuration to form battery modules having k battery submodules connected to each other in series and/or l battery submodules connected to each other in parallel. Thus, each battery module provides a voltage corresponding to the voltage of k battery submodules and a current corresponding to the current of l battery submodules. In some embodiments, all of the battery submodules of a single battery module are connected to each other in series, and k may equal an even number of at least two.

The battery system, according to some embodiments, includes a plurality of battery modules that are electrically connected to each other in series and/or in parallel in a isjp configuration to form a battery system having i battery modules connected to each other in series and/or j battery modules connected to each other in parallel. Thus, the battery system provides a voltage corresponding to the voltage of i battery modules and a current corresponding to the current of j battery modules. In some embodiments, all of the battery modules that are mechanically coupled to a single crossbeam are connected to each other in series or in parallel, and the battery modules that are mechanically coupled to different crossbeams are connected to each other in series or in parallel.

According to embodiments of the present invention, each battery module is mechanically coupled to a crossbeam and, in some embodiments, the combination of battery module(s) and crossbeam is self-supporting. Each crossbeam includes a coolant duct, such as an internal coolant duct, and each battery module is coupled to one of the crossbeams such that a side surface of a battery submodule of that battery module is in thermal contact with the crossbeam and, therefore, with the coolant duct. A side surface of the battery submodule, which is in thermal contact with the crossbeam, may be a surface surrounding the battery submodule at an angle of less than 180 degrees, in some embodiments an acute angle or a right angle, to a surface of the battery submodule at where electrical terminals are arranged. Thus, in the battery system, each battery submodule may be cooled by the crossbeam via a side surface of the battery submodule. Thus, coolant devices between adjacent layers of the battery cells may be omitted such that a height of the battery system is reduced and potential coolant leakage affects only a single battery cell layer.

Thus, with the battery system according to embodiments of the present invention, a new hierarchic structure for a battery system is provided that includes battery cells as the lowest hierarchical level, battery submodules as the next higher hierarchical level, followed by battery modules as the next higher hierarchical level that finally form the battery system. According to embodiments of the present invention, the battery submodules may be pre-assembled and are mechanically self-supporting. The battery modules may be pre-assembled from battery submodules and cooled by the crossbeams. Thus, a variable modular system for a cooled battery system is provided having electric properties that can be adjusted according to actual demands or desires and having mechanical properties that simplify the assembly of a battery system while having improved mechanical stability.

According to an embodiment of the battery system, each crossbeam supports a plurality of battery modules. Thus, a plurality of battery modules can be pre-assembled with a crossbeam, and the crossbeam may mechanically support the plurality of battery modules. Each battery module includes an even number of battery submodules arranged symmetrically with respect to the crossbeam, and also, battery modules adjacent to each other in a longitudinal direction of the crossbeam contact each other or are sparsely separated. Battery modules that are mechanically coupled to different crossbeams may be electrically connected to each other in series, and battery modules that are mechanically coupled to the same crossbeam may be electrically connected to each other in series or in parallel.

In some embodiments of the battery system, each battery module includes two submodules arranged such that a distance between side surfaces (e.g., side surfaces facing each other) of these battery submodules corresponds to or substantially equals a width of the crossbeam. Thus, the crossbeam fits into the space between the side surfaces of the two battery submodules of the battery module. Thus, the crossbeam is disposed between the two battery submodules, contacts one side surface of each of the two battery submodules, and then the battery submodules are mechanically coupled to the crossbeam.

According to an embodiment, a battery system includes a plurality of battery submodules, a plurality of battery modules, and a plurality of crossbeams. Each battery module is mechanically coupled to one of the crossbeams and is connected in series or in parallel to another one of the battery modules. Each battery submodule includes a side surface that is in thermal contact with the respective crossbeam. For example, embodiments of the present invention relate to battery systems including a plurality of battery modules, each of which include a plurality of battery submodules, and a plurality of crossbeams. Each of the battery submodules includes n secondary battery cells connected to each other in series and m secondary battery cells connected to each other in parallel. Each of the battery modules includes k battery submodules connected to each other in series and/or l battery submodules connected to each other in parallel. Each of the crossbeams includes a coolant duct. Each of the battery modules is mechanically coupled to at least one of the crossbeams, and battery modules coupled to different crossbeams are connected to each other in series and/or in parallel. Each crossbeam is, in some embodiments, mechanically coupled to a group of the battery modules (e.g., to two or more of the plurality of battery modules).

In another embodiment of the battery system, a space between two of the plurality of crossbeams corresponds to a width of two of the battery submodules. In some embodiments, the battery submodules are arranged symmetrically with respect to the crossbeams. Each battery submodule may contact only one crossbeam, for example, via one side surface of the battery submodule. Thus, packaging density of the battery cells in the battery system is further increased. In some embodiments, each battery module includes two battery submodules.

In another embodiment of the battery system, each battery module includes an even number of battery submodules, and each crossbeam is disposed between two of the battery submodules. In this embodiment, each crossbeam passes between a pair of the battery submodules and is in thermal contact with the side surfaces of at least the pair of the battery submodules.

In an embodiment of the battery system, each battery submodule has a first side surface and a second side surface that is shorter than the first side surface. One of more of the first side surfaces of each of the battery submodule is in thermal contact with a crossbeam. For example, the battery cells in each battery submodule are arranged along a longitudinal direction that is substantially parallel to a longitudinal direction (e.g., a length direction) of the crossbeam. Thus, a contact area (e.g., thermal contact) between the battery submodules and the crossbeam is relatively great and submodule cooling is relatively good. In some embodiments, a height of the crossbeam is equal to or greater than a height of the first side surface of the battery submodules that is in thermal contact with the crossbeam. Thus, the contact area between the crossbeam and the contacted battery submodule is relatively large and/or is maximized.

In another embodiment of the battery system, the secondary battery cells have a planar shape (e.g., a prismatic or rectangular shape) and have a maximum extension (e.g., have a greatest dimension) in a direction substantially perpendicular to a length direction of a contacted crossbeam.

For example, each battery submodule includes at least one stack and, in some embodiments, a plurality of stacks, of battery cells, each of the stacks has a stacking direction that is substantially parallel to the length direction of the contacted crossbeam. In this way, the packaging density of battery cells in the battery system is further increased.

In some embodiments, each battery submodule includes a module frame that may be formed of interconnected side, top, and front plates that are fixed to each other and/or are fixed to the stacked battery cells. The module frame provides mechanical stability to the self-supported battery submodule. The mechanical and electrical connection between battery submodules within a single battery module is, in some embodiments, integrated into a single connection component. The connection component may be mechanically coupled to the module frame of each of the battery submodules and connects the electric terminals of the battery cells of the battery submodule to each other. The connection component may further mechanically couple the battery module to a crossbeam. A plurality of battery submodules may be pre-assembled to the connection component. Each battery module may include a connection component in the form of a cell connection unit (e.g., a cell connector) connected to a plurality of battery submodules and mechanically coupled to a plurality of module frames. The cell connection unit may include a substantially planar layer of insulating material (e.g., an insulating layer) with surface metallization forming electric contacts that connect groups of the battery cell terminals to each other and further reduces the height of the battery system.

In another embodiment of the battery system, one or more battery modules, for example, two battery modules, are connected to a single cell supervisory circuit (CSC). The CSC monitors and controls the voltage and/or current of each battery cell of a battery submodule to balance the voltage and/or current between the individual battery cells to increase the lifespan of the battery cells. The CSC may include a plurality of cell supervisory chips (e.g., two cell supervisory chips), with each cell supervisory chip including 12 measuring and control inputs/outputs.

The battery system according to an embodiment of the present invention includes a housing that includes a frame and a ground plate. The frame may be formed of two longitudinal frame beams and two frame crossbeams and may be mechanically connected to (e.g., welded to) the ground plate. The crossbeams are mechanically coupled to (e.g., screwed to) a first frame beam (e.g., a first longitudinal frame beam) and a second frame beam opposite to the first frame beam. The crossbeams may be assembled with the housing after one or more battery modules, each including a plurality of battery submodules, are assembled with the crossbeams. With the battery system according to an embodiment of the present invention, various sizes of frame beams, ground plates, and/or crossbeams can be connected to pre-assembled battery modules to provide a modular battery system having internal cooling of the side surfaces of the battery submodules. Thus, an available packaging space (e.g., a packaging space in an electric vehicle) can be optimally used.

The first and the second frame beams (e.g., the frame beams mechanically coupled to the crossbeams) each include coolant distributor lines that are fluidly connected to the (internal) coolant ducts of the crossbeams. Thus, a coolant feed line and a coolant return line for a battery system according to an embodiment of the present invention is provided. The coolant distributor lines include coolant ports (e.g., a coolant inlet and a coolant outlet) configured to be connected to coolant piping outside the housing of the battery system.

According to another embodiment of the present invention, a vehicle including a battery system as described above is provided.

Further aspects and features of the present invention will be apparent from the following detailed description of exemplary embodiments thereof, taken in conjunction with the appended claims and their equivalents.

BRIEF DESCRIPTION OF THE DRAWINGS

Aspects and features of the present invention will become apparent to those of ordinary skill in the art by describing, in detail, exemplary embodiments thereof with reference to the attached drawings, in which:

FIG. 10 is a schematic top view of the battery system shown in FIG. 9 according to an embodiment.

DETAILED DESCRIPTION

Figure 1:
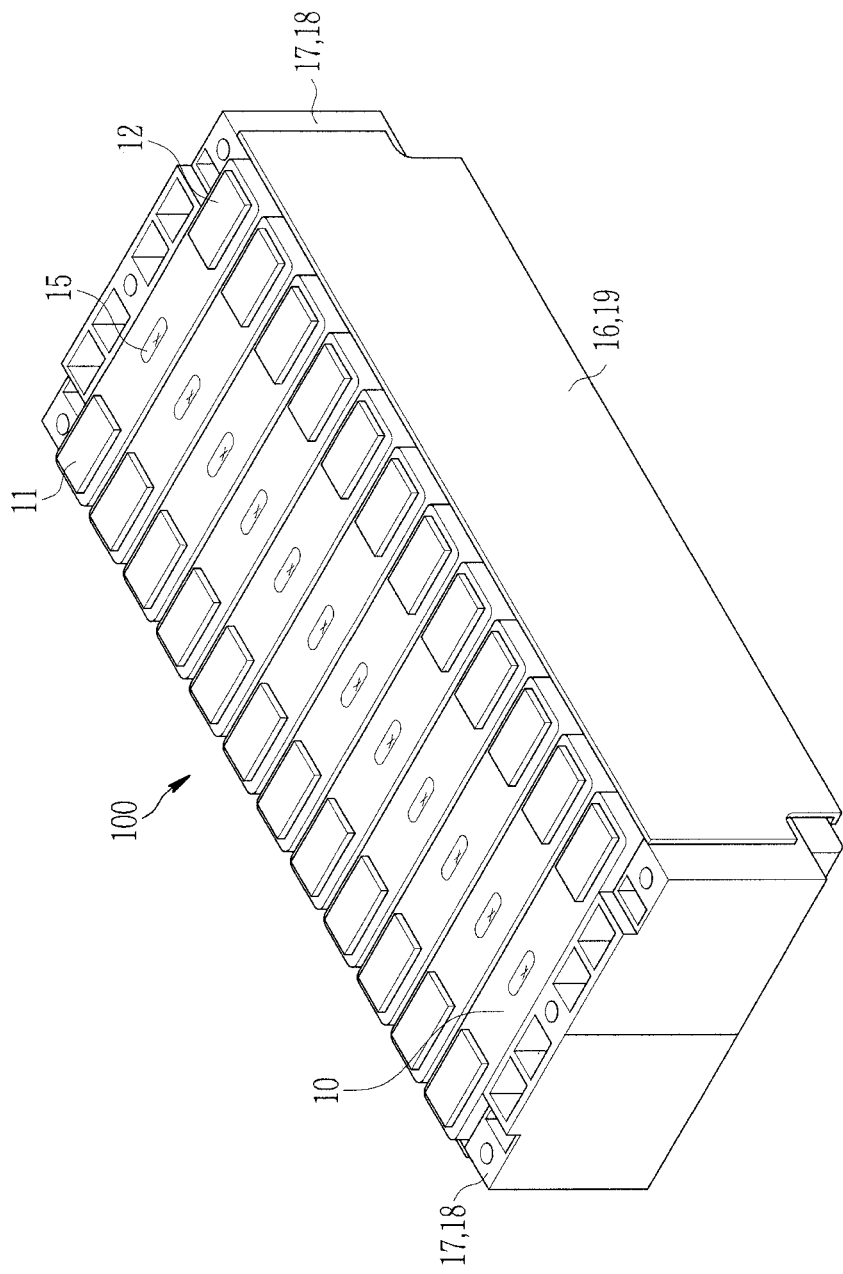
FIG. 1 is a perspective view of a battery submodule according to an embodiment.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements. The same reference numerals designate the same elements. As used herein, the term "and/or" includes any and all combinations of one or more of the associated listed items. Further, the use of "may" when describing embodiments of the present invention relates to "one or more embodiments of the present invention." Expressions, such as "at least one of," when preceding a list of elements, modify the entire list of elements and do not modify the individual elements of the list. Also, the term "exemplary" is intended to refer to an example or illustration. As used herein, the terms "use," "using," and "used" may be considered synonymous with the terms "utilize," "utilizing," and "utilized," respectively.

It will be understood that, although the terms first, second, third, etc. may be used herein to describe various elements, components, regions, layers, and/or sections, these elements, components, regions, layers, and/or sections should not be limited by these terms. These terms are used to distinguish one element, component, region, layer, or section from another element, component, region, layer, or section. Thus, a first element, component, region, layer, or section discussed below could be termed a second element, component, region, layer, or section without departing from the teachings of example embodiments. In the figures, dimensions of the various elements, layers, etc. may be exaggerated for clarity of illustration.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

The terminology used herein is for the purpose of describing particular example embodiments of the present invention and is not intended to be limiting of the described example embodiments of the present invention. As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

The battery management units (BMUs), cell supervision circuits (CSCs), and/or any other relevant devices or components according to embodiments of the present invention described herein may be implemented utilizing any suitable hardware, firmware (e.g., an application-specific integrated circuit), software, and/or a suitable combination of software, firmware, and hardware. For example, the various components of the BMUs and/or CSCs may be formed on one integrated circuit (IC) chip or on separate IC chips. Further, the various components of the BMUs and/or CSCs] may be implemented on a flexible printed circuit film, a tape carrier package (TCP), a printed circuit board (PCB), or formed on a same substrate as the BMUs and/or CSCs. Further, the various components of the BMUs and/or CSCs may be a process or thread, running on one or more processors, in one or more computing devices, executing computer program instructions and interacting with other system components for performing the various functionalities described herein. The computer program instructions are stored in a memory which may be implemented in a computing device using a standard memory device, such as, for example, a random access memory (RAM). The computer program instructions may also be stored in other non-transitory computer readable media such as, for example, a CD-ROM, flash drive, or the like. Also, a person of skill in the art should recognize that the functionality of various computing devices may be combined or integrated into a single computing device or the functionality of a particular computing device may be distributed across one or more other computing devices without departing from the scope of the exemplary embodiments of the present invention.

Figure 2:
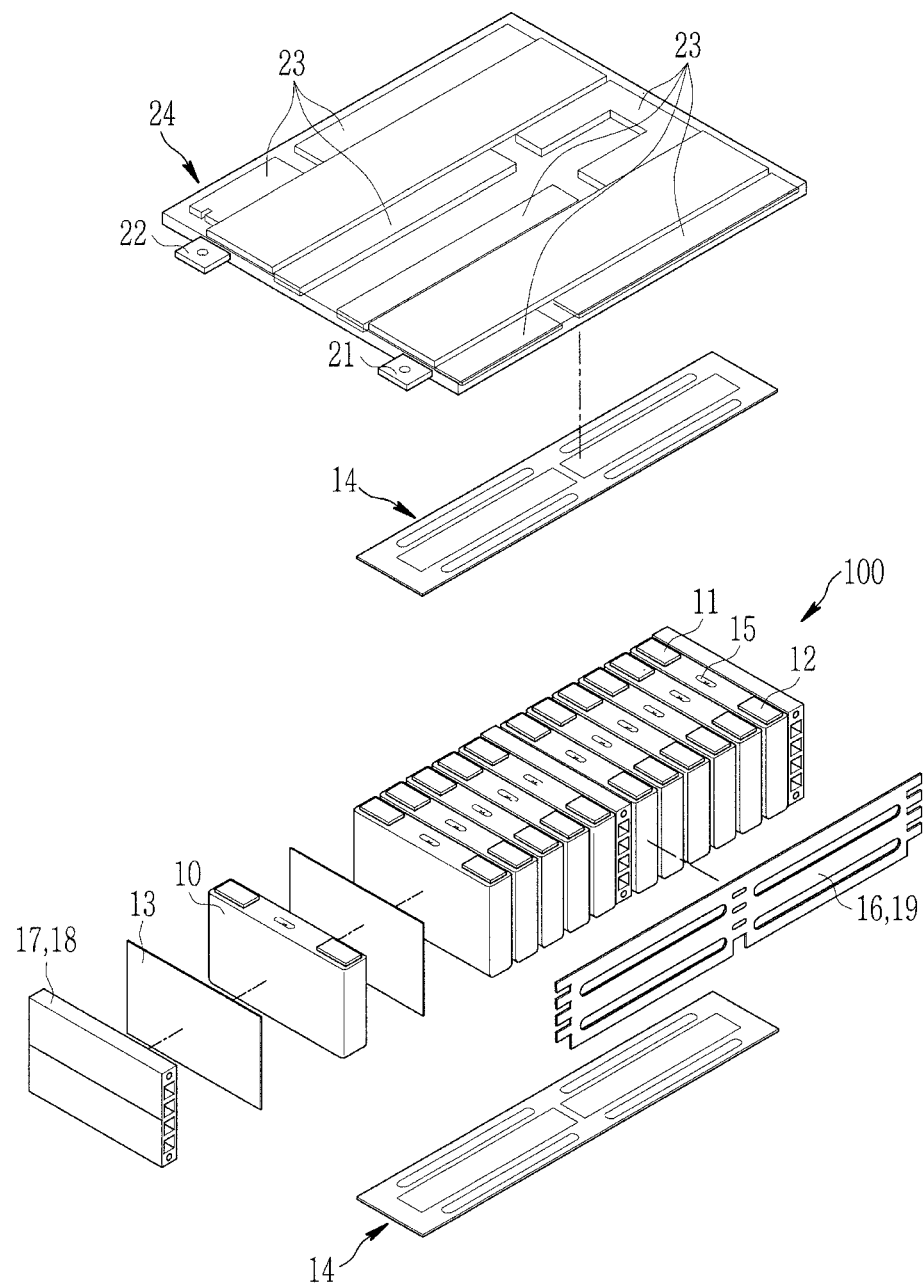
FIG. 2 is an exploded view of the battery submodule shown in FIG. 2 according to an embodiment.

Referring to FIG. 1, an exemplary embodiment of a battery submodule 100 includes a plurality of aligned secondary battery cells 10, each of which have substantially planar sides (e.g., the battery submodule 100 includes a plurality of aligned prismatic secondary battery cells). A pair of module front plates 18 is provided to face front surfaces of the battery cells 10 (e.g., respective ones of the module front plates 18 face outermost surfaces of outermost ones of the battery cells 10). The module front plates 18 are mechanically coupled to a pair of module side plates 19 facing side surfaces of the battery cells 10 (e.g., ones of the modules side plates 19 face opposite side surfaces of each of the battery cells 10). Thereby the plurality of battery cells 10 is fixed together. The battery submodule 100 has first side surfaces 16, corresponding to the module side plates 19, and second side surfaces 17, corresponding to the module front plates 18. The second side surfaces 17 are shorter than the first side surfaces 16. Referring to FIG. 2, the battery submodule 100 according to an embodiment further includes a pair of module top plates 14 that is mechanically coupled to the module front and side plates 18, 19. The module front plates 18, the module side plates 19, and the module top plates 14 constitute a self-supporting body of the battery submodule 100.

As shown in FIGS. 1 and 2, each battery cell 10 is a prismatic (e.g., rectangular) cell, and the wide, flat surfaces of the battery cells 10 are stacked together (e.g., are stacked facing each other) to form the battery submodule 100. Further, each battery cell 10 includes a battery case accommodating an electrode assembly and an electrolyte. The battery case is hermetically sealed and is provided with negative and positive electrode terminals 11 and 12 having different polarities from each other and a vent 15. The vent 15 is a safety device of the battery cell 10 and acts as a passage through which gas generated in the battery cell 10 is exhausted to the outside of the battery cell 10. In order to avoid any unwanted electric contact between the individual battery cells 10 and/or between the outermost battery cells 10 and the module front plates 18, isolation foils 13 are disposed between adjacent battery cells 10 and/or between the outermost battery cells 10 and the module front plates 18.

Figure 3:
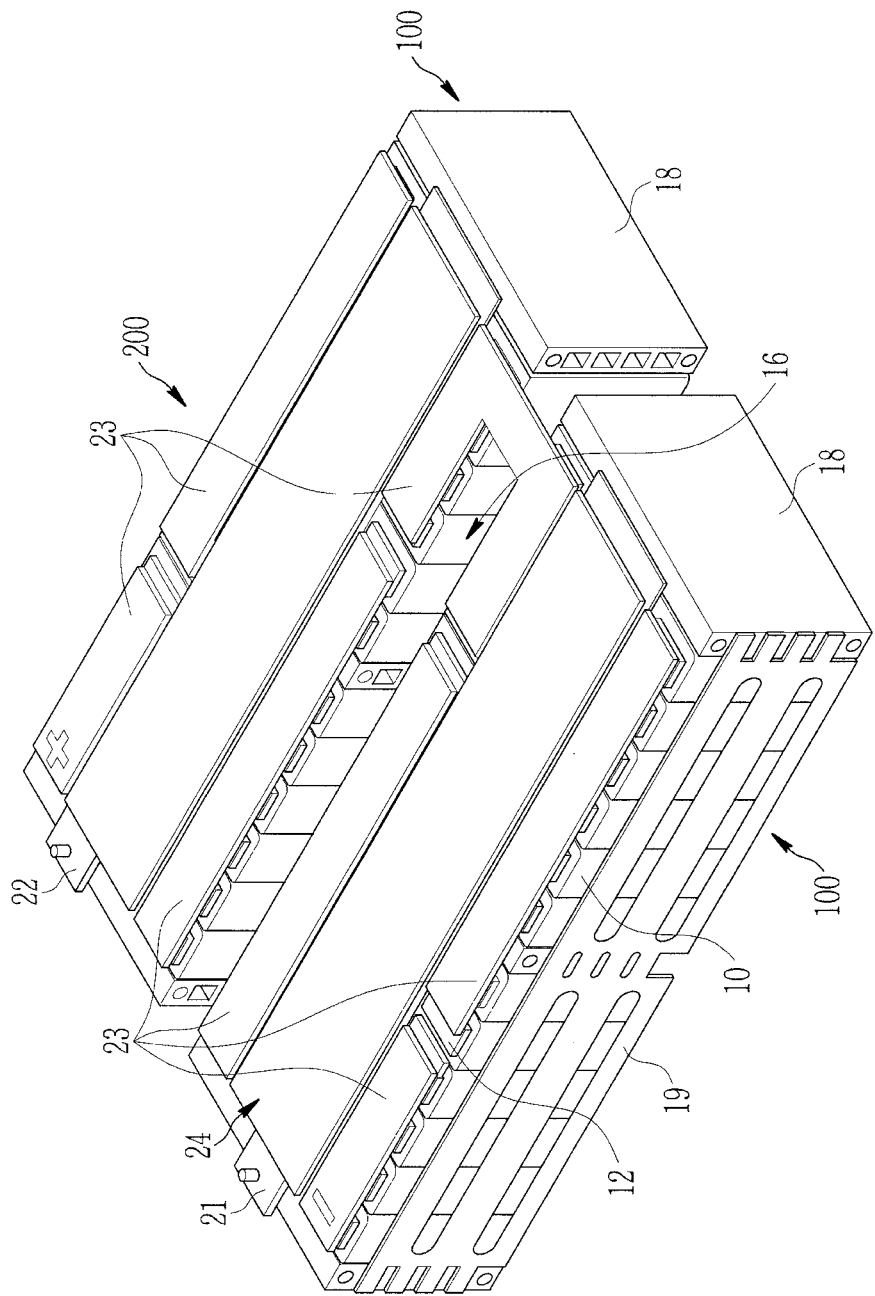
FIG. 3 is a perspective view of a battery module according to an embodiment.

As further shown in FIG. 2, the battery cells 10 are electrically connected to each other using a cell connection unit (CCU) 24 (e.g., a cell connector) that constitutes a part of a battery module 200 according to an embodiment and shown, in detail, in FIG. 3. The cell connection unit 24 is mechanically coupled to the module top and side plates 14, 19 of two battery submodules 100 and includes negative and positive module terminals 21, 22 and a copper metallization (e.g., a copper metal connection or copper metal layer or trace) that forms a plurality of conducting elements 23. The conducting elements 23 are spaced apart from each other and, thus, electric contact between two conducting elements 23 can only be achieved via one or more of the battery cells 10. The conducting elements 23 are connected to the negative or positive terminal 11, 12 (e.g., one of the electrode terminals) of the secondary battery cells 10 and connect four battery cells 10 of each battery submodule 100 to each other in parallel and connect the thusly formed bundles of four battery cells 10 to other bundles of four battery cells 10 in series. By connecting a bundle of four battery cells 10 of a first battery submodule 100 with a bundle of four battery cells 10 of a second battery submodule 100, the cell connection unit 24 thusly connects the first and second battery submodules 100 to each other in series.

Figure 4A:
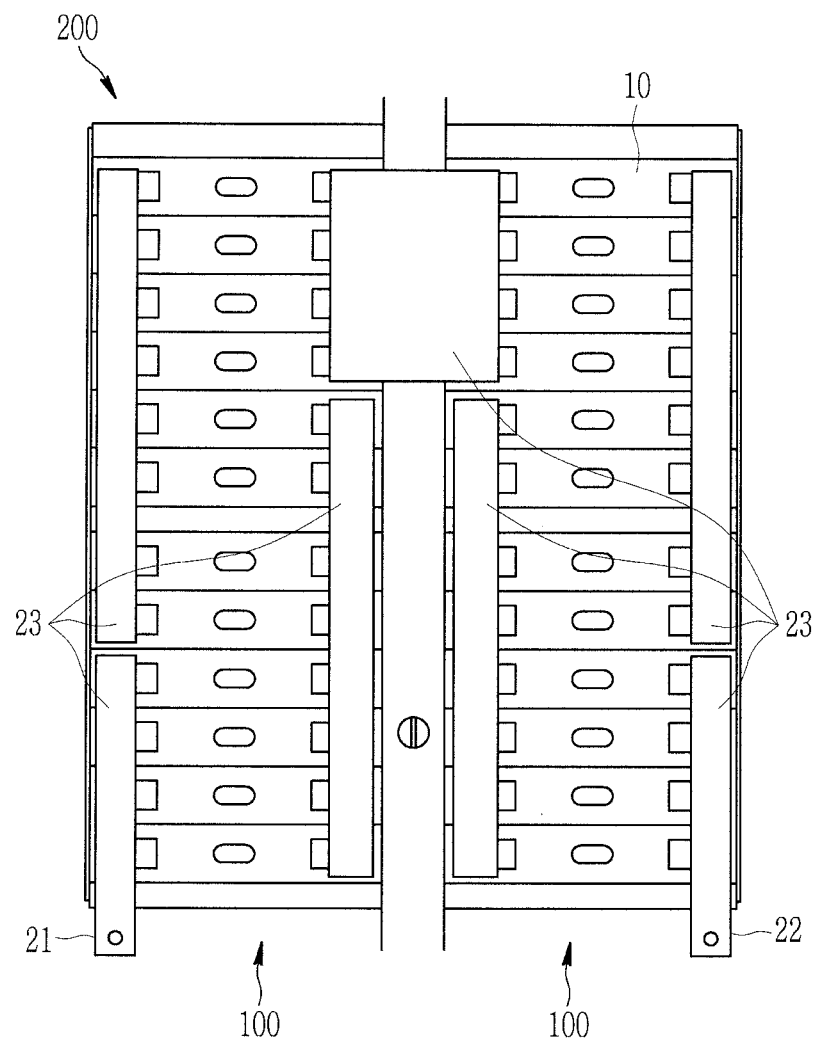
FIG. 4A is a schematic top view of the battery module according to an embodiment.
Figure 4B:
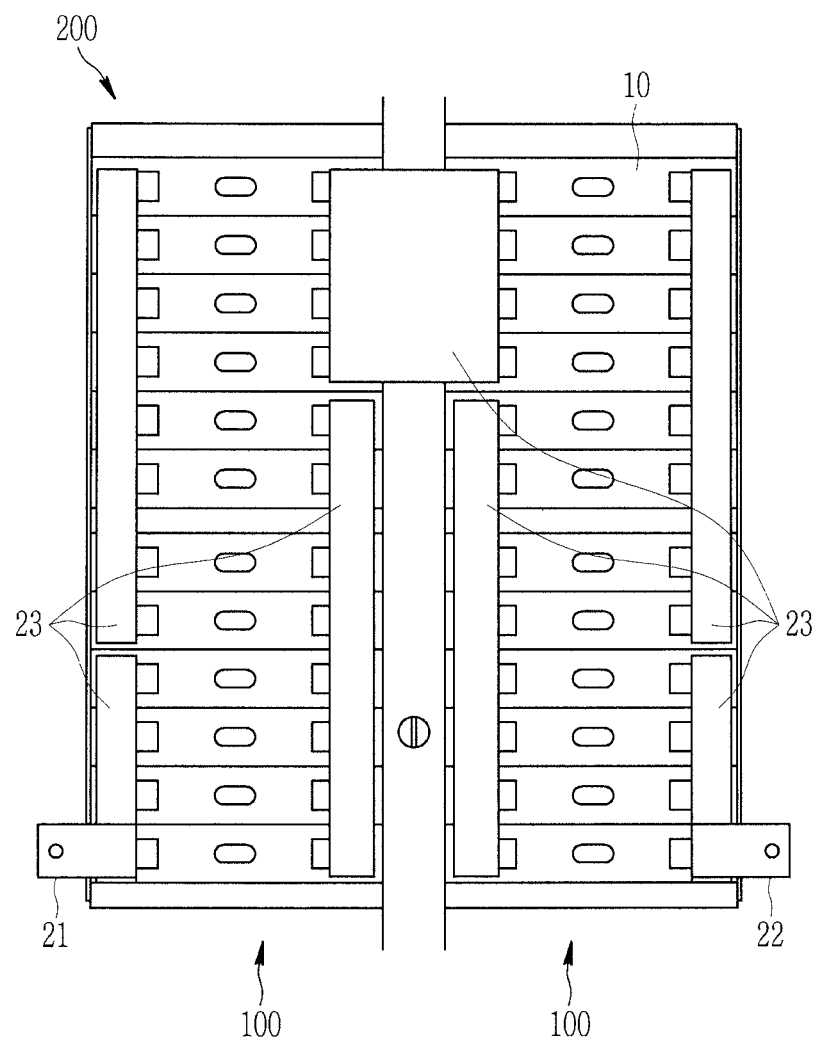
FIG. 4B is a schematic top view of the battery module according to another embodiment.

Referring to FIGS. 3 and 4, the battery module 200 includes two battery submodules 100 having a 4p3s configuration (e.g., a configuration of four battery cells 10 connected to each other in parallel forming a battery cell bundle and three of the battery cell bundles connected to each other in series). Thus, the resulting battery module 200 includes a 4p6s configuration. The battery module 200 may be used as a power source having the added voltage of six battery cells 10 (e.g., the combined voltage of six battery cells 10) and the added current of four battery cells 10 (e.g., the combined current of four battery cells 10). The electrical power of the battery module 200 is, thus, twenty-four times the power of a single battery cell 10. With each battery cell 10 providing approximately 3.648 V, the battery module 200 provides approximately 21.89 V. The module terminals 21 and 22 may be disposed on a single front surface of the battery module 200, as shown in FIG. 3. In another embodiment, the module terminals 21 and 22 may be disposed on a single front surface of the battery module 200 in the extending direction of a corresponding conducting element 23, as shown in FIG. 4A. In another embodiment, the module terminals 21 and 22 may be disposed on both sides of the battery module 200 in a direction perpendicular to both sides of the battery module 200, as shown in FIG. 4B.

Figure 5:
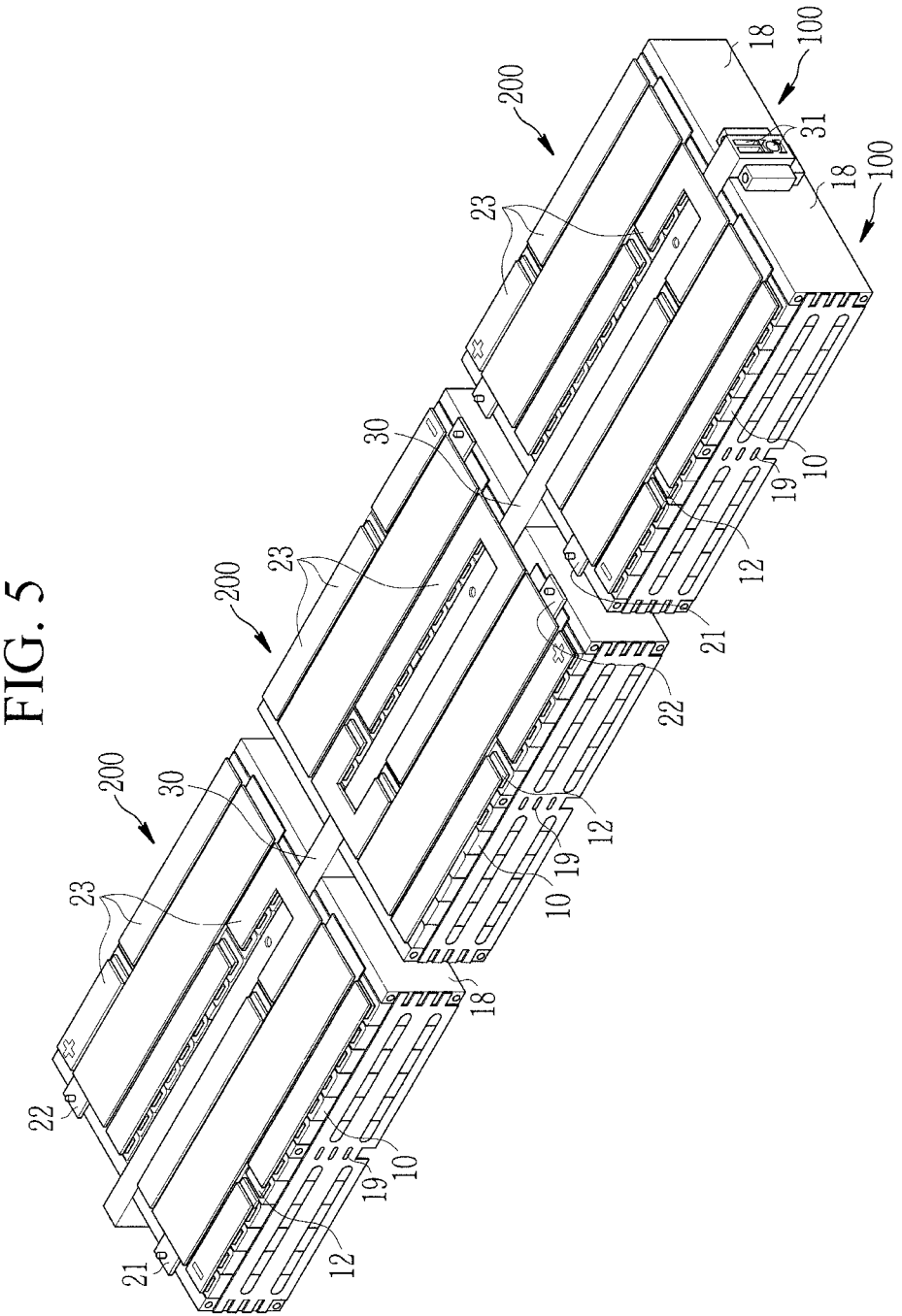
FIG. 5 is a perspective view of three of the battery modules shown in FIG. 3 mechanically coupled to a crossbeam according to an embodiment.

According to an embodiment shown in FIG. 5, three battery modules 200 are mechanically coupled to one crossbeam 30. Thereby, two battery submodules 100 are electrically connected to each other via the cell connection unit 24 at their top sides as shown in FIG. 3. The crossbeam 30 is inserted into a space between the battery submodules 100 from the bottom side of the battery module 200 and is mechanically coupled to each of the battery submodules 100. Thereby, each of the battery submodules 100 is mechanically supported by the crossbeam 30. The mechanical coupling between the battery modules 200 and the crossbeam 30 is, in some embodiments, achieved by using one or more fixing devices attached to the bottom sides of the battery modules 200 and to the crossbeam 30 and/or by an attachment device of the crossbeam 30 inserted into corresponding features of the CCU 24

Figure 6:
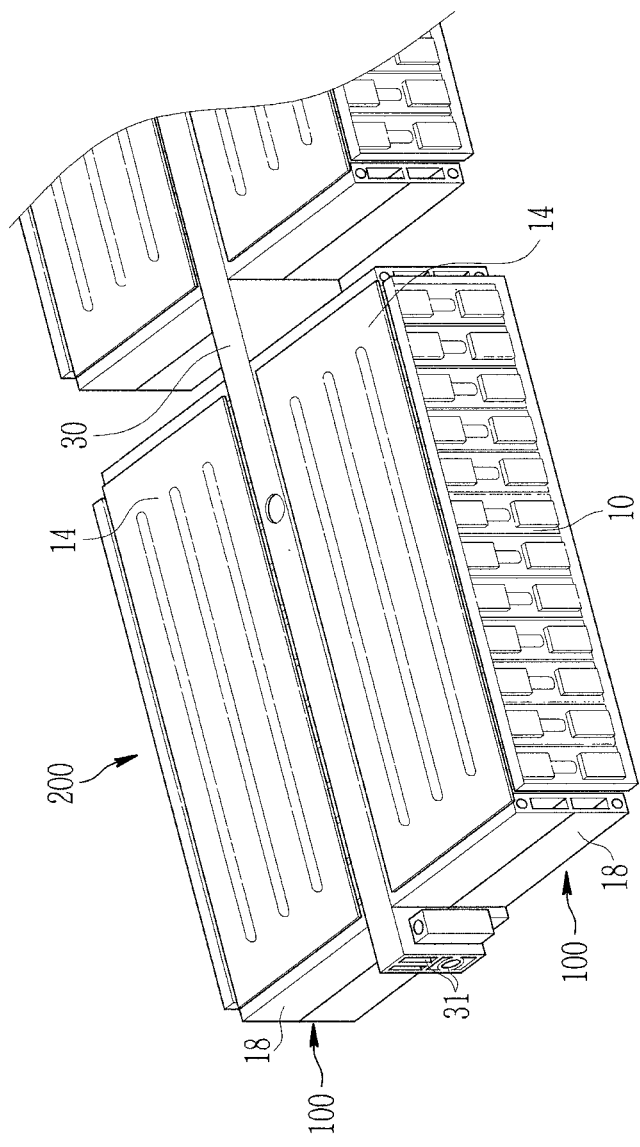
FIG. 6 is a detailed view of one of the battery modules shown in FIG. 3 mechanically coupled to the crossbeam according to an embodiment.

As shown in FIG. 6, the crossbeam 30 includes two coolant ducts 31 that pass through an entire length of the crossbeam 30. The coolant ducts 31 are formed of steel pipes welded into the matrix of the extruded aluminum crossbeam 30. In other embodiments, the coolant ducts 31 are formed by encapsulated piping lines inserted into one or more suitable cavities in the crossbeam 30. As mentioned above, each of the battery submodules 100 has the first side surfaces 16 and the second side surfaces 17, which correspond to the module front plates 18, and the second side surfaces 17 are shorter than the first side surfaces 16. As shown in FIG. 6, a height of the first side surface 16 is approximately equal to or equals a height of the crossbeam 30 such that an entire one of the first side surfaces 16 of the battery submodule 100 is in thermal contact with the crossbeam 30. The first side surfaces 16 may be surfaces surrounding the battery submodule 100 at an angle of less than 180 degrees, in some embodiments at an acute angle or a right angle, to a surface of the battery submodule 100 on which the negative and positive terminals 11, 12 of the battery cells 10 are arranged, as shown in FIGS. 1 and 5. As shown in FIG. 5, the crossbeam 30 has at least the same or substantially the same height as the first side surface 16 and extends in a longitudinal direction that is substantially parallel to the length direction of the module side plates 19.

Figure 7:
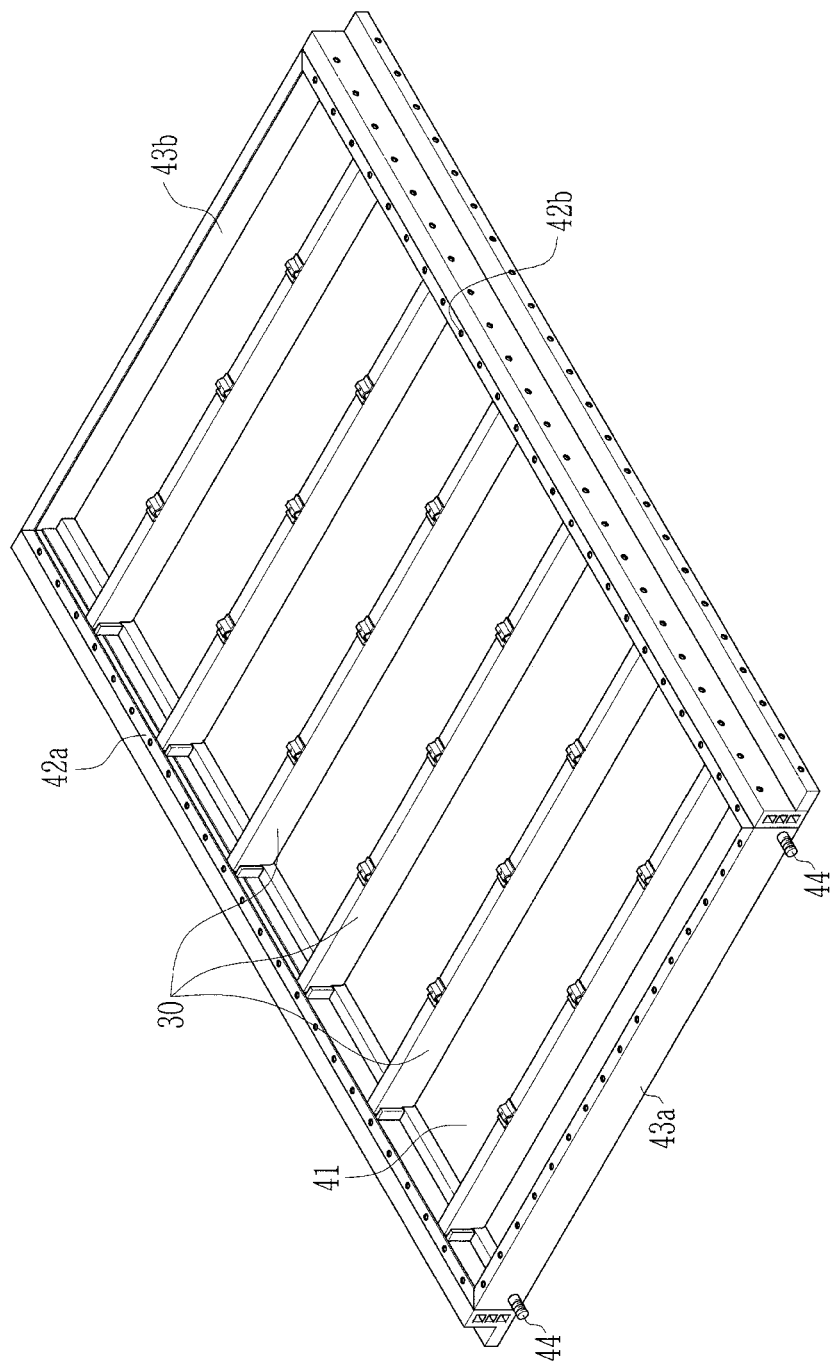
FIG. 7 is a perspective view of a plurality of the crossbeams mounted to a housing according to an embodiment.

According to the embodiment shown in FIG. 7, a plurality of the crossbeams 30 are mechanically coupled to a housing for a battery system. The housing includes an aluminum ground plate 41 that is welded to a frame, and the frame includes two longitudinally extruded aluminum frame beams 42a, 42b and two extruded aluminum frame crossbeams 43a, 43b. A first longitudinal frame beam 42a faces a second longitudinal frame beam 42b, and a first frame crossbeam 43a faces a second frame crossbeam 43b. Together, the frame beams 42a, 42b, 43a, 43b constitute a rectangular frame. The crossbeams 30 are mounted into the frame using screws and/or snap fit attaching devices. In practice, before being mounted into the housing, the crossbeams 30 may be coupled to a plurality of the battery modules 200. Between the crossbeams 30, spaces are formed in which battery submodules 100 are to be inserted (or accommodated).

As shown in FIGS. 7-10, the first longitudinal frame beam 42a includes an internal coolant feed line 45, and the second longitudinal frame beam 42b includes an internal coolant return line 46. The coolant return and feed lines 45, 46 each include a coolant port 44 for connection to coolant piping external to the housing. The crossbeams 30 include the internal coolant ducts 31 and are mechanically coupled to the longitudinal frame beams 42a, 42b such that the coolant ducts 31 are fluidly connected with the coolant feed and return lines 45, 46.

Figure 8:
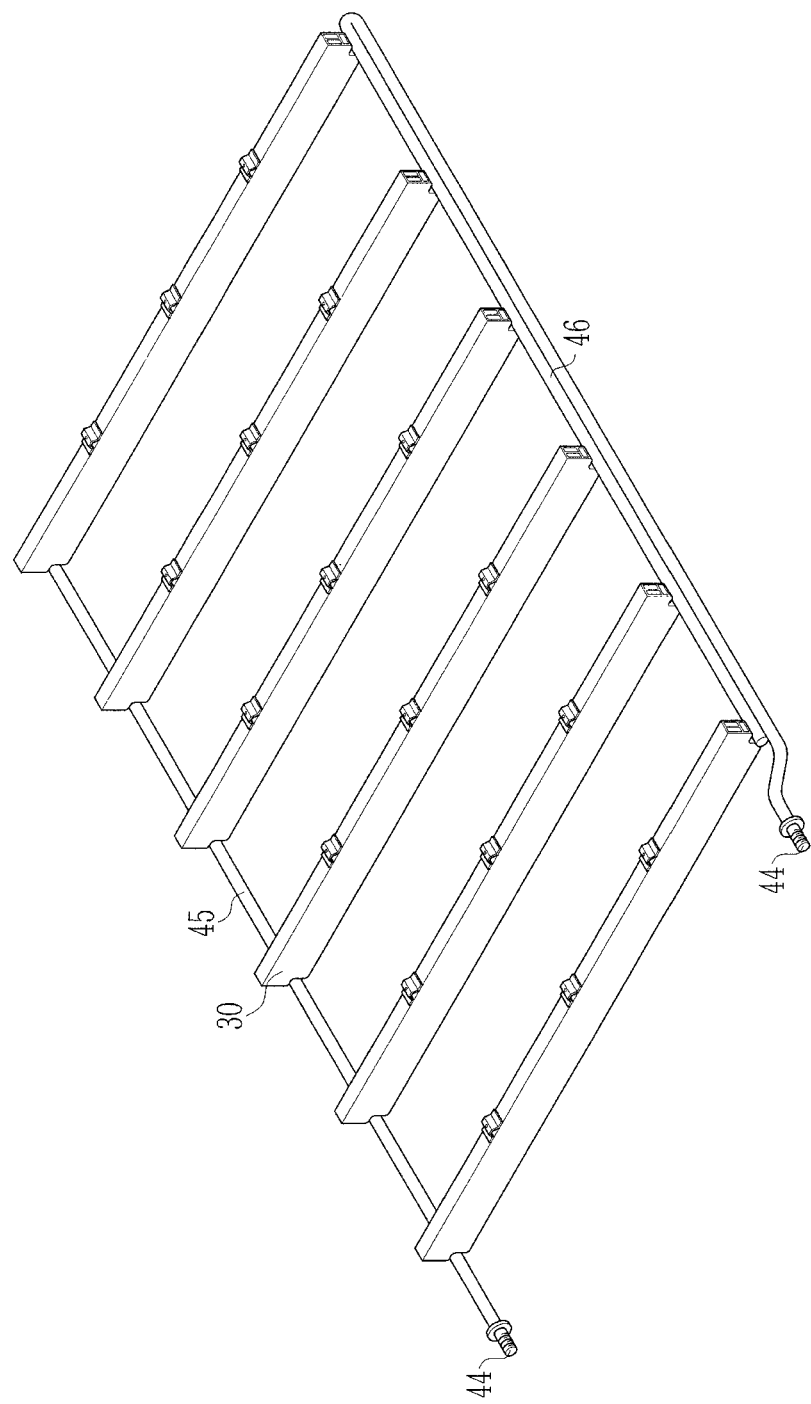
FIG. 8 is a perspective view of a coolant circuit according to an embodiment.
Figure 9:
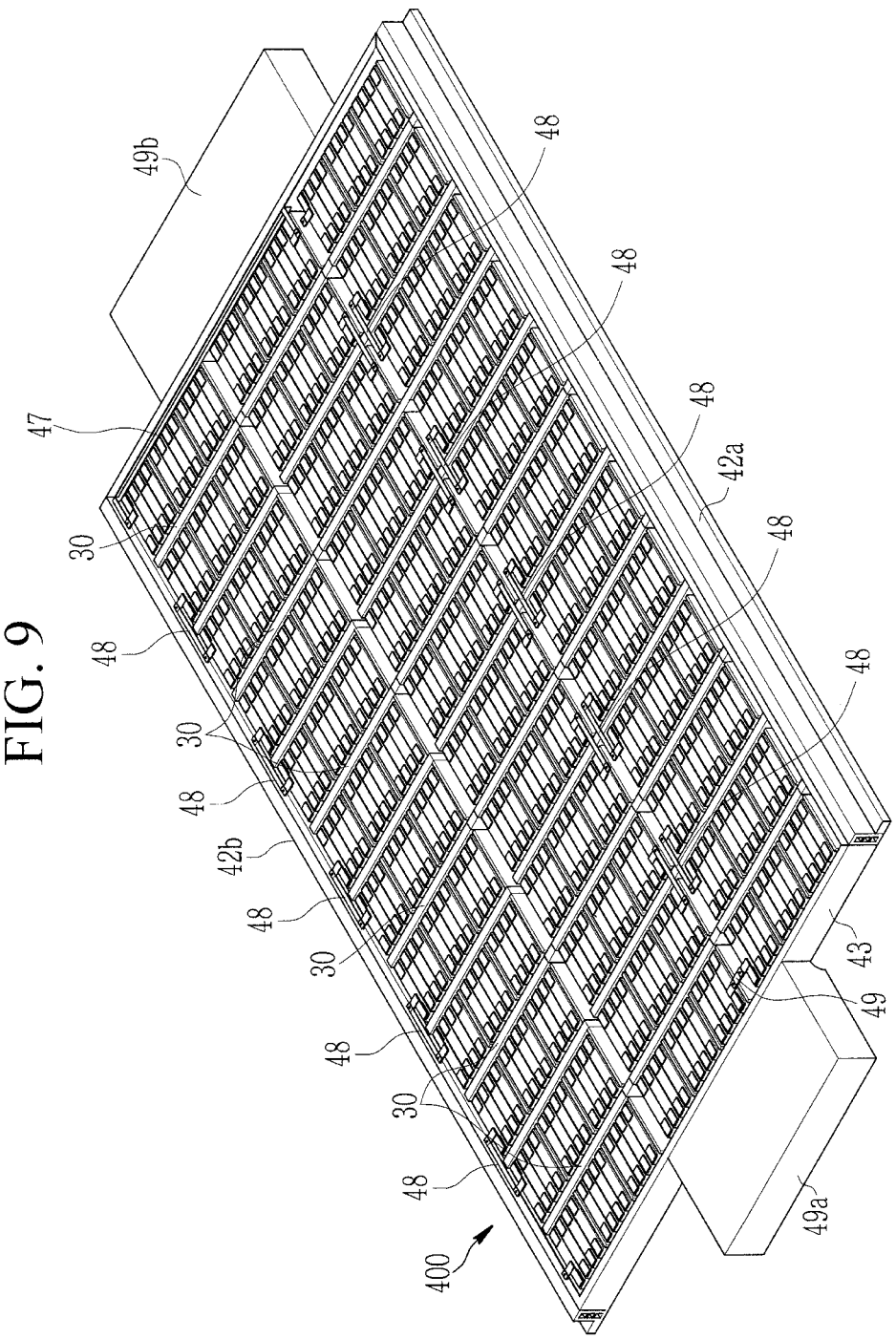
FIG. 9 is a perspective view of a battery system according to an embodiment.

FIG. 9 shows a battery system 400, according to an embodiment, including the housing as shown in FIGS. 7 and 8 and further including six crossbeams 30 with three battery modules 200 attached to each crossbeam 30, as shown in FIG. 5. In the spaces on both sides of the crossbeams 30, battery submodules 100 according to FIGS. 1 and 2 are disposed such that one of the first side surfaces 16 of each battery submodule 100 is in direct and, thus, is in thermal contact with, a side surface of one crossbeam 30. Thus, coolant distributed to the crossbeams 30 via the coolant ports 44 and the longitudinal frame beams 42a, 42b absorbs the heat emitted by the battery cells 10 of the battery submodules 100. By cooling the battery cells 10 via the side surface of each battery submodule 100, cooling devices in the ground plate 41 may be omitted and, thus, the height of the battery system can be reduced (e.g., reduced to about 100 mm).

Within the battery submodules 100 placed in the housing according to FIGS. 9 and 10, the battery cells 10 are connected to each other as shown in FIGS. 3 and 4. In first, second, and third rows of battery modules M1-M6, M7-M12, and M13-M18, adjacent battery modules are electrically connected to each other through conductor rail elements 48. A port (e.g., a terminal) of a battery module M1 (e.g., the first battery module M1 of the first row of the battery modules M1-M6) is electrically connected a first E/E box (Electrical/Electronic box) 49a. A negative module terminal 21 of the battery module M6 of the first row of battery modules M1-M6 and a positive module terminal 22 of the battery module M7 of the second row of the battery modules M7-M12 are electrically connected to each other through a busbar 47. The battery module M12 of the second row of battery modules M7-M12 is electrically connected to the corresponding battery module M13 of the third row of battery modules M13-M18 through a busbar 49. The battery module M18 in the third row of battery modules M13-M18 is electrically connected to a second E/E box 49b.

Thus, in the battery system 400 shown in FIGS. 9 and 10, eighteen battery modules 200 are connected to each other in series, with each of the battery modules 200 including two battery submodules 100 that are connected to each other in series, and each of the battery submodules 100 having a 4p3s configuration. The eighteen battery modules M1-M18 are connected to each other in series between the first and second E/E boxes 49a and 49b and each of the battery modules M1-M18 has (or outputs) a voltage of approximately 21.89 V, the battery system 400 has (or outputs) a voltage of approximately 394 V (21.89V*18).

For controlling voltage and current (e.g., for controlling charging and discharging voltage and current) of the battery system 400, the first and/or second E/E boxes 49a, 49b may include a battery management unit (BMU), a high voltage connector, an input and/or fuse, a relay, a current sensor, an electromagnetic compatibility filter (EMC-Filter), a pre-charge relay and/or resistor, and/or an HV interface. The battery system 400 further includes eight cell supervisory circuits (CSC) 50 for current measurement and control of the individual battery cells 10, for example, for balancing voltage and/or current between the battery cells 10 of the battery system 400. Each CSC 50 includes two CSC chips, and each of the CSC chips includes twelve measuring and control inputs. Thus, one CSC 50 for every two battery modules 200 or forty-eight battery cells 10 is sufficient.

Although the present invention has been described with reference to example embodiments, those skilled in the art will recognize that various changes and modifications to the described embodiments may be performed, all without departing from the spirit and scope of the present invention. It is the applicant's intention to cover by the claims herein, all such uses of the present invention, and those changes and modifications which could be made to the example embodiments of the present invention herein chosen for the purpose of disclosure, all without departing from the spirit and scope of the present invention. Thus, the example embodiments of the present invention should be considered in all respects as illustrative and not restrictive, with the spirit and scope of the present invention being indicated by the appended claims and their equivalents.

SOME OF THE REFERENCE NUMERALS

10 secondary battery cell
11 negative electrode terminal
12 positive electrode terminal
13 isolation foil
14 module top plate
15 vent
16 first side surface
17 second side surface
18 module front plate
19 module side plate
20 third side surface
100 battery submodule
21 negative module terminal
22 positive module terminal
23 conducting element
24 cell connection unit
200 battery module
30 crossbeam
31 coolant duct
41 ground plate
42a, 42b longitudinal frame beam
43, 43a, 43b frame crossbeam
44 coolant port
45 coolant feed line
46 coolant return line
47, 49 busbar
48 conductor rail
49a, 49b E/E box
50 cell supervision circuit

What is claimed is:

1. A battery system comprising:
   a battery module comprising a plurality of battery submodules connected to each other in series or in parallel, each of the battery submodules comprising:
      a plurality of secondary battery cells electrically connected to each other in series or in parallel; and
      a module frame configured to mechanically self-support the respective battery submodule;
   a crossbeam comprising a coolant duct; and
   a cell connector connected to the battery submodules, the cell connector extending over the crossbeam to mechanically couple to the module frames of a plurality of the battery submodules to each other,
   wherein the battery module is mechanically coupled to the crossbeam, and the crossbeam is in thermal contact with a first side surface of at least one of the battery submodules of the battery module.

2. The battery system according to claim 1, wherein the first side surface of two of the battery submodules of the battery module are spaced from each other by a distance corresponding to a width of the crossbeam, and
   wherein the crossbeam is between the two battery submodules and contacts the first side surface of each of the two battery submodules.

3. The battery system according to claim 1, further comprising a plurality of the battery modules connected to each other in series and/or in parallel and a plurality of the crossbeams,
   wherein each of the crossbeams is mechanically coupled to a group of the battery modules.

4. The battery system according to claim 3, wherein a space between adjacent ones of the crossbeams corresponds to a width of two of the battery submodules.

5. The battery system according to claim 4, wherein, in each of the battery submodules, a second side surface is shorter than the first side surface, and
   wherein the first side surface of each of the battery submodules is in thermal contact with the crossbeam.

6. The battery system according to claim 5, wherein the secondary battery cells each have a planar shape and a largest dimension in a direction substantially perpendicular to a longitudinal direction of the crossbeam.

7. The battery system according to claim 3,
   wherein each of the battery modules comprises a cell connector connected to the battery submodules in a respective one of the battery modules and mechanically coupled to a plurality of the module frames.

8. The battery system according to claim 3, further comprising a cell supervision circuit connected to a plurality of the battery modules.

9. The battery system according to claim 3, further comprising a housing comprising a frame and a ground plate mechanically connected to the frame, the frame comprising a plurality of longitudinal frame beams and a plurality of frame crossbeams, wherein the crossbeams are mechanically coupled to a first one of the frame beams and a second one of the frame beams that is opposite the first one of the frame beams.

10. The battery system according to claim 9, wherein coolant distributor lines are integrated into the first one and the second one of the frame beams and are fluidly connected to the coolant ducts in the crossbeams.

11. The battery system according to claim 1, wherein the battery submodule comprises a plurality of bundles comprising the secondary battery cells electrically connected to each other in parallel, and
wherein the plurality of bundles is electrically connected to each other in series.

12. The battery system according to claim 1, wherein the secondary battery cells in each of the battery submodules of the battery module are arranged along a length direction that is parallel to a length direction of the crossbeam.

13. The battery system according to claim 1, each of battery submodules of the battery module comprises a stack of the secondary battery cells, and
wherein each of the stacks has a stacking direction that is parallel to a length direction of the crossbeam.

14. The battery system according to claim 1, wherein each of the battery submodules comprises the first side surfaces and second side surfaces that are shorter than the first side surface, and
wherein one of the first side surfaces of each of the battery submodules is in thermal contact with the crossbeam.

15. The battery system according to claim 1, wherein the secondary battery cells each have a planar shape and a largest dimension in a direction substantially perpendicular to a longitudinal direction of the crossbeam.

16. The battery system according to claim 1, further comprising a cell supervision circuit connected to the battery module.

17. The battery system according to claim 1, further comprising a housing comprising a frame and a ground plate mechanically connected to the frame, the frame comprising a plurality of longitudinal frame beams and a plurality of frame crossbeams,
wherein the crossbeam is mechanically coupled to a first one of the frame beams and a second one of the frame beams that is opposite the first one of the frame beams.

18. The battery system according to claim 17, wherein coolant distributor lines are integrated into the first one and the second one of the frame beams and are fluidly connected to the coolant ducts in the crossbeams.

19. The battery system according to claim 1, wherein each of the module frames comprises a plurality of side plates, a plurality of top plates, and a plurality of front plates interconnected with each other, and
wherein the cell connector electrically connects two battery submodules that are spaced apart from each other across the crossbeam, mechanically couples the module frames of the two battery submodules, and mechanically couples the battery module to the crossbeam.

20. The battery system according to claim 1, wherein each of the battery submodules comprises:
at least three bundles comprising secondary battery cells electrically connected to each other in parallel;
a first conducting element electrically connecting first electrodes of the secondary battery cells in a first one of the three bundles and second electrodes of the secondary battery cells in a second one of the three bundles to each other;
a second conductive member electrically connecting first electrodes of the secondary battery cells in the second one of the bundles and second electrodes of the secondary battery cells in a third one the three bundles to each other; and
a third conductive member for electrically connecting first electrodes of the secondary battery cells in the third one of the bundles to each other, and
wherein second electrodes of the secondary battery cells in the first one of the bundles are electrically connected to each other in parallel by the cell connector.

\* \* \* \* \*